United States Patent

[11] 3,527,140

| [72] | Inventors | George M. Clark<br>Houston, Tex.;<br>Horace V. Smith, Sr., Houston, Tex. |
|---|---|---|
| [21] | Appl. No. | 764,063 |
| [22] | Filed | Oct. 1, 1968 |
| [45] | Patented | Sept. 8, 1970 |
| [73] | Assignee | Metrol Corporation<br>Houston, Tex.<br>a corporation of Texas |

[54] AUTOMATIC WINDING DEVICE
18 Claims, 8 Drawing Figs.

[52] U.S. Cl. ................................................. 91/170,
60/57, 60/97, 92/15
[51] Int. Cl. ................................................. F01b 1/00
[50] Field of Search ................................... 91/21, 44,
45, 170, 186, 411; 60/97SEQ, 57, 62; 92/15, 17,
25, 27, 28, 30

[56] References Cited
UNITED STATES PATENTS
1,847,468  3/1932  Bowers ...................... 60/97(SEQ)UX

| 2,488,045 | 11/1949 | Wagner et al. ............ | 91/45 |
|---|---|---|---|
| 2,491,361 | 12/1949 | Burdick ..................... | 60/57UX |
| 2,718,878 | 9/1955 | Du Bois ..................... | 60/57UX |

*Primary Examiner*—Edgar W. Geoghegan
*Attorneys*—James F. Weiler, Jefferson D. Giller, William A. Stout, Paul L. DeVerter II, Dudley R. Dobie, Jr. and Henry W. Hope

ABSTRACT: The present invention is directed to apparatus used to automatically impart rotary motion to an element such as a gear. The present invention utilizes a four-way valve to channel actuating fluid to a diaphragm actuator which reciprocates a pawl that contacts and turns the gear during one of its reciprocating strokes. A contact member moving with the first pawl actuates alternatively one of two button valves to vary the pressure differential within the four-way valve which shifts the flow of fluid to and from the actuator, giving the pawl its reciprocal motion. A braking pawl is used to prevent undesired or accidental movement of the gear.

Patented Sept. 8, 1970

3,527,140

George M. Clark
Horace V. Smith, Sr.
INVENTORS

BY James F. Weiler
Jefferson D. Giller
Dudley R. Dobie Jr.
Henry W. Hope
ATTORNEYS

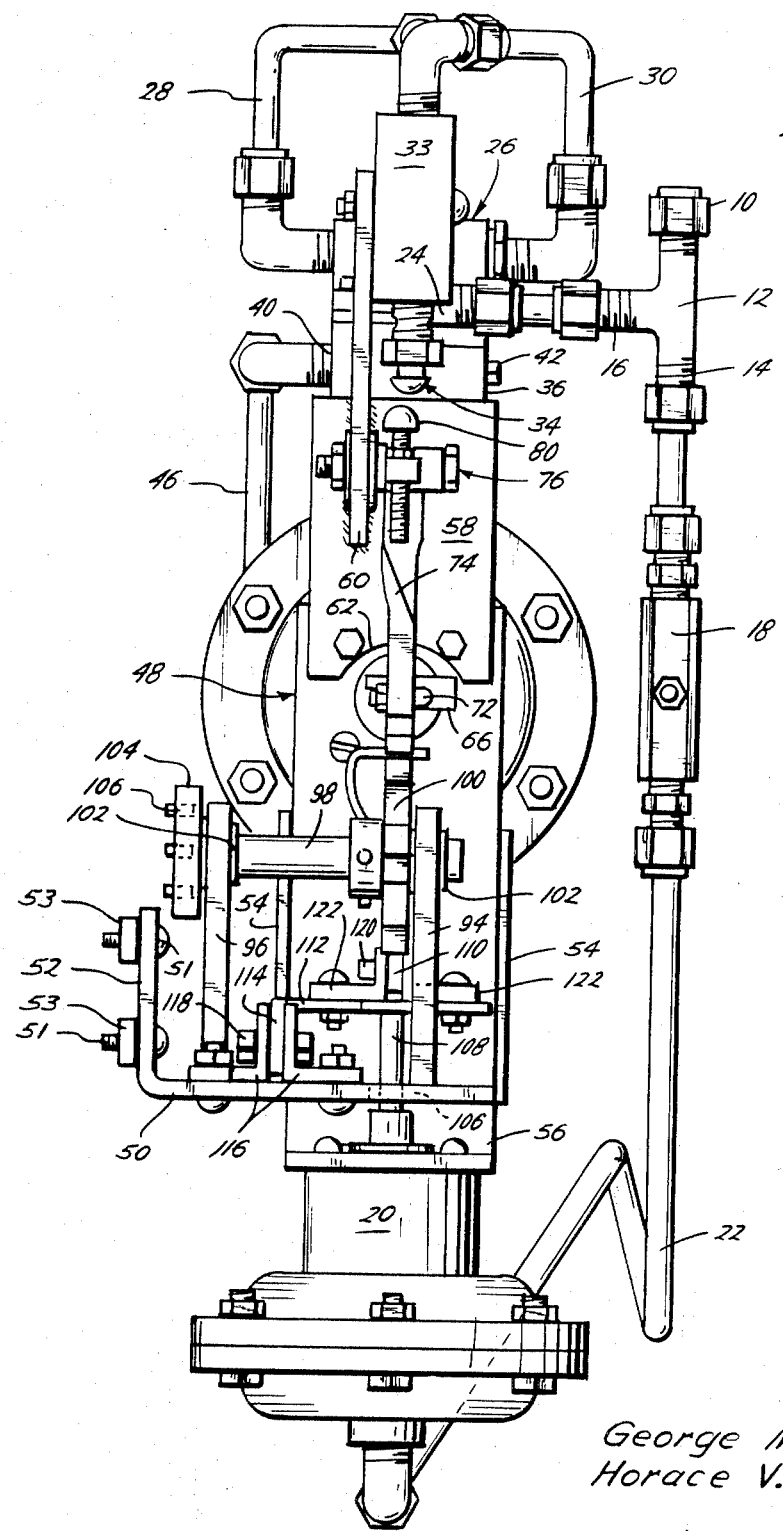

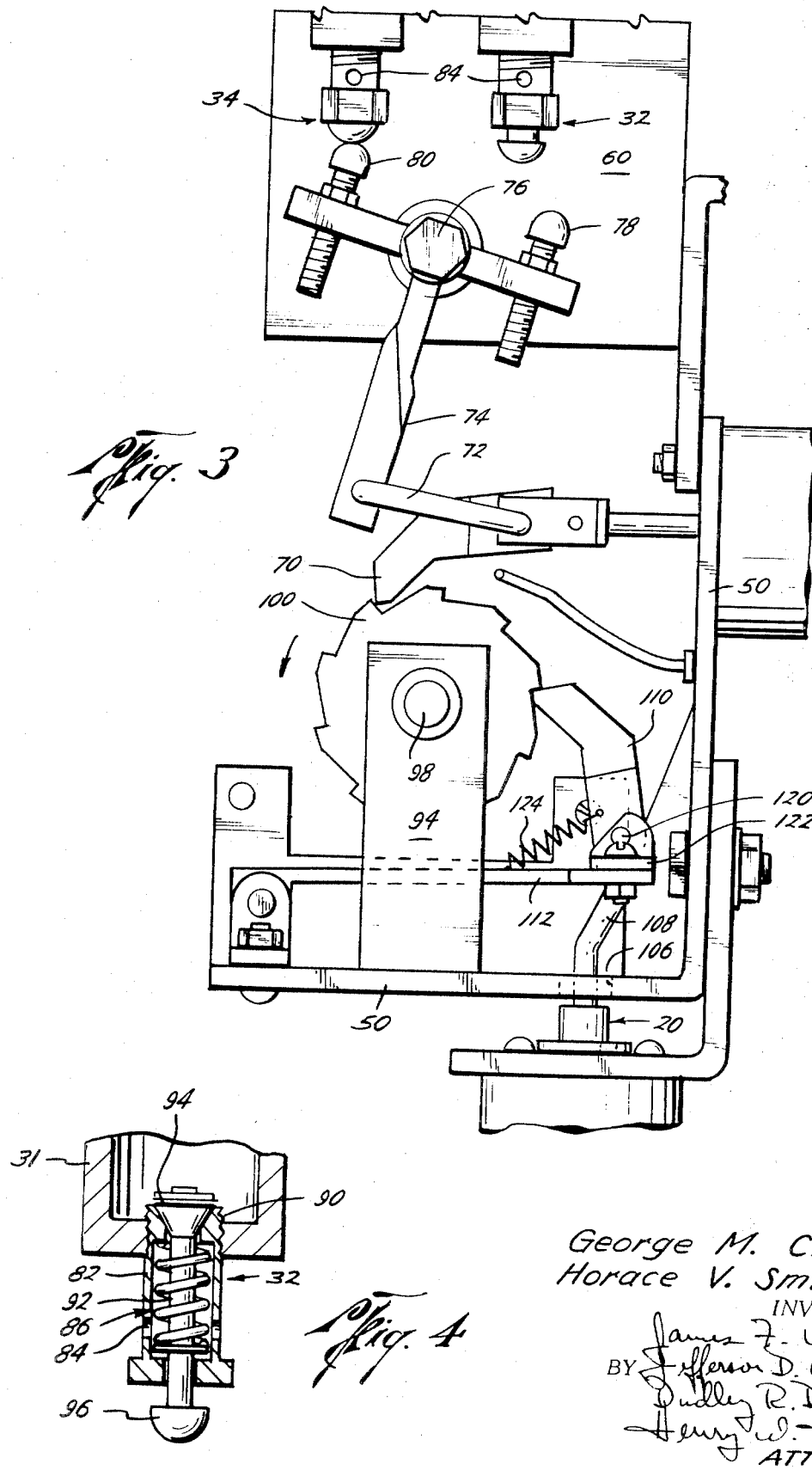

Patented Sept. 8, 1970
3,527,140
Sheet 4 of 4
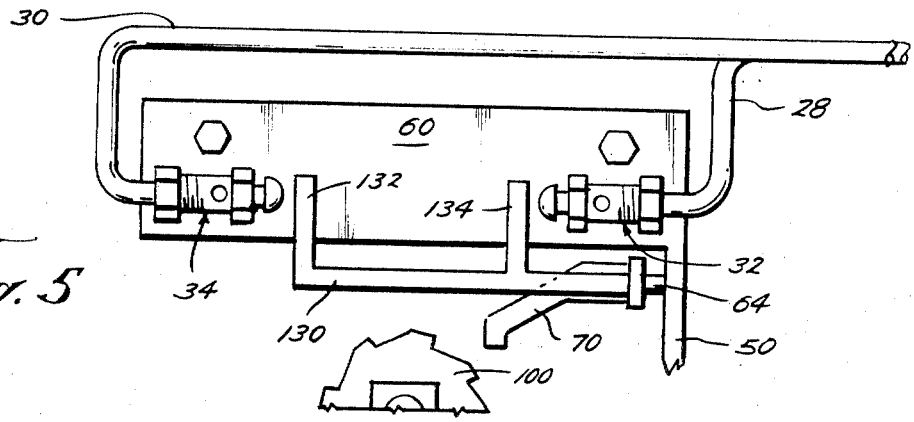
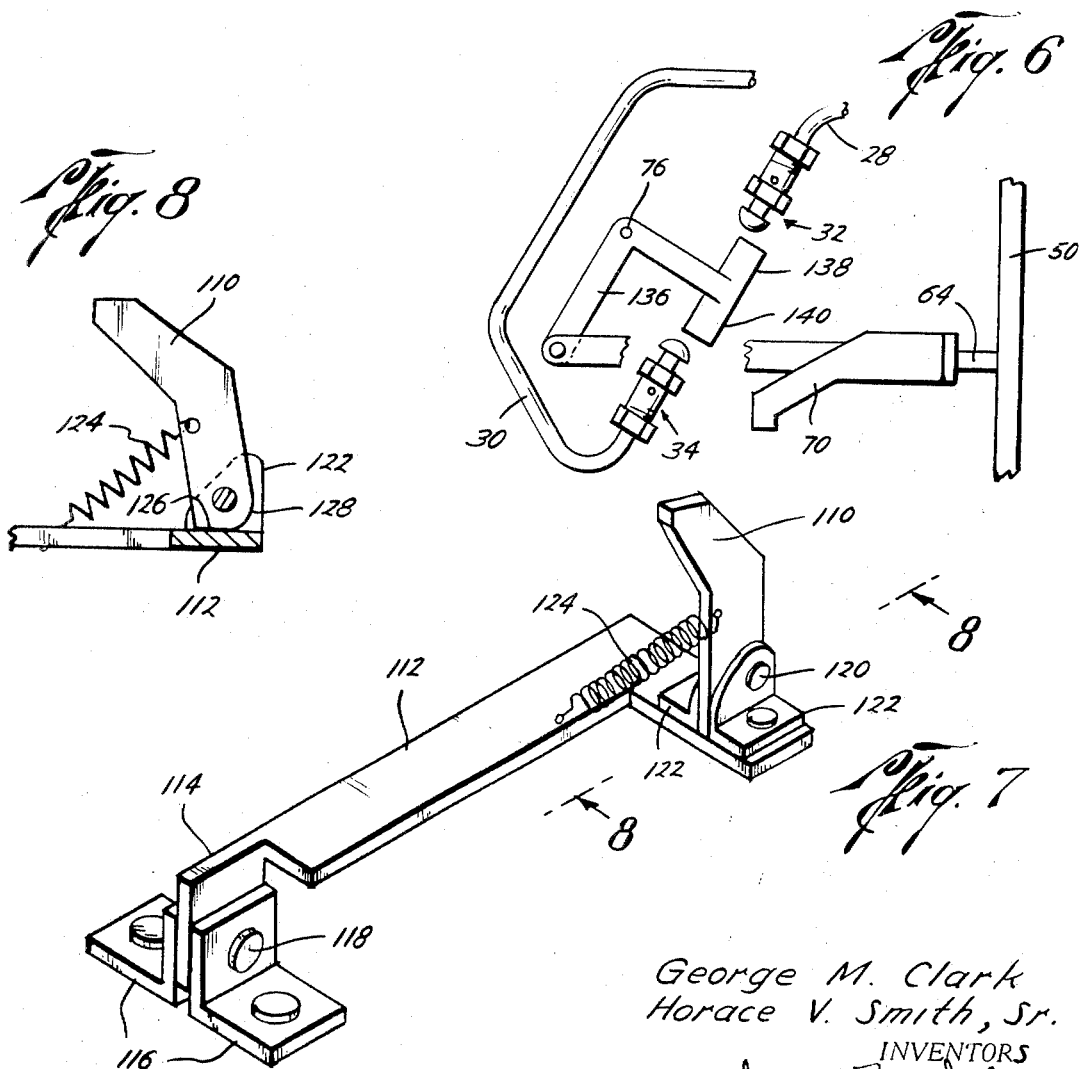
George M. Clark
Horace V. Smith, Sr.
James F. Weiler
INVENTORS
BY Jefferson D. Giller
Dudley R. Dobie Jr.
Henry W. Hope
ATTORNEYS

3,527,140

AUTOMATIC WINDING DEVICE

BACKGROUND OF THE INVENTION

The present invention is directed to pneumatically operated apparatus which is used to intermittently rotate a wheel, gear, or the like (hereinafter referred to only as a "gear"). Such apparatus has a number of applications, such as automatically making predetermined adjustments or for automatically winding clocks in remote unattended locations.

By way of example, there exist many situations in which apparatus must perform in an automated fashion. One such situation is a production and test assembly used in controlling and testing the production of oil wells. Such an assembly is disclosed in our U.S. Pat. No. 3,265,086, issued August 9, 1966, and entitled "Fluid Flow Control System". An important part of such an assembly is a strip chart recorder upon which is recorded the results of the testing of the well production. An important part of the recorder itself is a clock, generally one that will run for an eight-day period, and accordingly, known as a spring driven eight-day clock. This clock is essential due to the fact that it is generally necessary to coordinate the test results recorded with the time that the tests were run.

Such production and test assemblies are generally designed to operate automatically or semi-automatically and are often placed in very remote locations. It is necessary, therefore, to have means to automatically wind the clock, and this is one application of the present invention. Prior to this invention, it was quite often necessary to have operators come by the station to wind the clock to insure proper operation. Provision of automatic devices for this purpose, however, presents numerous problems in insuring a reliable and accurate performance.

SUMMARY OF THE INVENTION

The present invention utilizes pneumatic means to intermittently rotate the gear. The novel combination of elements disclosed herein utilizes a four-way valve to alternately supply gas to and exhaust gas from an actuator to give a reciprocal movement to a drive pawl which turns the gear.

Co-acting with the movement of the drive pawl is a contact member which repeats a pattern of movement between contact release valves. The alternate contact between the release valves and the contact member shifts the pressure differential in the four-way valve to change the flow of gas to and from the actuator.

A braking pawl is also incorporated to prevent movement of the gear in all but the desired direction. The braking pawl is also pneumatically operated and provision is made for a relatively slow backing off of this pawl to prevent any sudden jerk when the operation is halted.

It is, therefore, an object of the present invention to provide a pneumatic device for intermittently rotating a gear.

It is a further object of the present invention to provide such a device which will operate in a reliable and accurate manner.

A still further object of the present invention is to provide a novel combination of elements which will reciprocate a driving pawl toward and away from the gear, whereby the gear will be rotated in an intermittent fashion.

Still another object of the present invention is to provide means which act in conjunction with the reciprocal movement of the driving pawl to control the pneumatic means actuating said driving pawl.

Yet another object of the present invention is to provide such apparatus which further includes a pneumatically operated brake pawl to insure against rotation of the gear in a direction other than that desired.

Another object of the present invention is to provide such apparatus which is relatively simple in operation, design, construction and use, and which may be used to automatically rotate a member a predetermined amount.

Other and further objects, features and advantages will be apparent from the following description of a presently preferred embodiment of the invention, given for the purpose of disclosure, when taken in conjunction with the accompanying drawings.

BRIEF DESCRIPTION OF THE DRAWINGS

In the accompanying drawings, like character references designate like parts throughout the several views, which views are as follows:

FIG. 2 is an end view of the apparatus shown in FIG. 1;

FIG. 3 is a side view of a portion of the apparatus shown in FIG. 1, the driving pawl being at the end of its outstroke;

FIG. 4 is a section view of one of the button release valves used in the present invention;

FIG. 5 is a side view of an alternate arrangement of the contact member and button valves;

FIG. 6 is yet another arrangement for the contact member and button valves;

FIG. 7 is a perspective view of the brake pawl and the support apparatus for the brake pawl; and FIG. 8 is a partial section view of the brake pawl as seen along Section Lines 8—8 of FIG. 7.

BRIEF DESCRIPTION OF THE PREFERRED EMBODIMENTS

Figure 1:
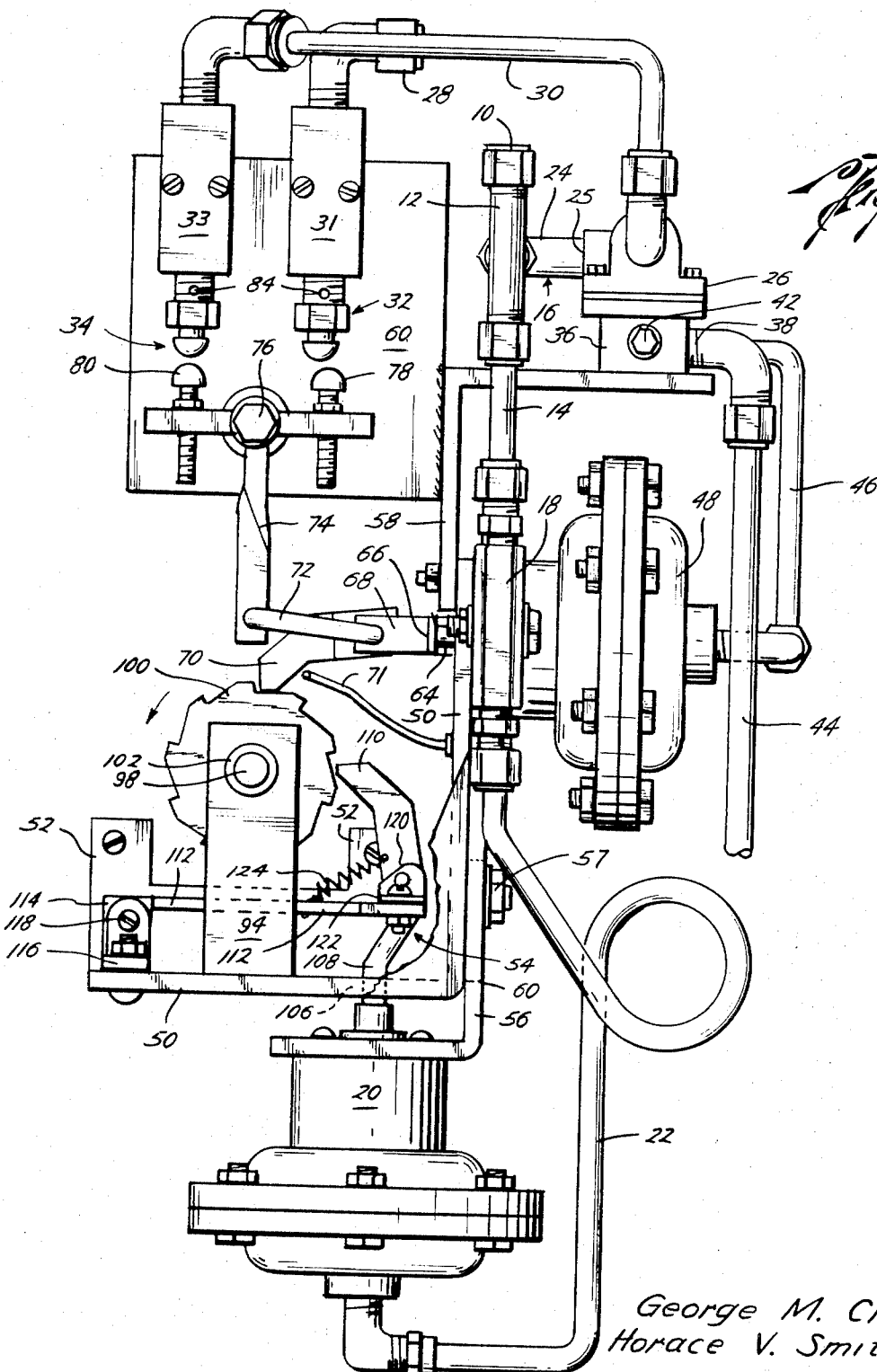
FIG. 1 is a side view of the present invention.

Referring now to FIG. 1, the present invention will be discussed in detail. An inlet 10 extends upwardly and carries appropriate threaded nut means for the attachment of a suitable line or hose carrying the actuating pneumatic fluid or compressed gas, such as compressed air (all of which shall be sometimes hereinafter referred to simply as "air", "gas" or "fluid"). A T-shaped member 12 divides the gas into two channels 14 and 16. The channel 14 connects with the valve 18 which is connected to the second diaphragm actuator 20 by the line 22. The valve 18 allows unrestricted flow to the actuator 20 but restricts flow away from it. For simplicity, therefore, valve 18 will sometimes be referred to as a flow control valve. This second diaphragm acutator 20 will be further discussed below.

Returning now to the channel 16, this channel is connected to elbow 24, which is, in turn, connected to the inlet 25 of the primary control valve 26. This valve 26 is a typical four-way valve well known in the art and is operated by establishing a pressure differential within the valve. A suitable valve is the Meadmatic Model 400A or 402A manufactured by Mead Specialties Company of Chicago, Illinois. Although this valve is known in the prior art, some explanation will be given throughout the discussion in order to more fully describe the present invention.

The actual valve chamber of the valve 26 in which the piston is located is the upper half of the valve as seen in FIGS. 1 and 2. From opposite ends of this valve chamber extend lines 28 and 30 which connect with button or contact release valves 32 and 34, respectively. The support blocks 31 and 33 are used to connect the valves to the supporting plate 60.

The primary valve 26 has three additional outlet ports 36, 38 and 40. The outlet 36 is sealed by a nut 42. The outlet 38 merely exhausts through line 44 to the atmosphere. In case of liquid being used to actuate the system, the exhaust line 44 would connect with an appropriate storage vessel. The outlet 40 (see FIG. 2) is connected by the line 46 to the first or primary diaphragm actuator 48.

The diaphragm actuators 20 and 48 are also well known in the art and they function upon the receipt of fluid pressure through their respective supply lines 22 and 46 to extend their actuator rod outwardly. Both are spring biased so that when the actuating fluid is removed from the diaphragm chamber, the actuator rods will be retracted. By the alternate supplying of actuating fluid to and withdrawing the fluid from, the actuators, reciprocating movement of the actuator rods is achieved.

Discussing now the supporting framework for the present invention, a generally L-shaped bracket 50 is the main bracing member and carries an upturned flange 52 which may be used in conjunction with appropriate bolts 51 and shock absorbing mounts 53 to attach the device to a wall, the sidewall of an instrument cabinet, or the like. Angle braces 54 are located at the corner of the L-shaped bracket for added rigidity, the closest angle support 54 being broken away in FIG. 1 to aid in the illustration of the braking pawl.

A second L-shaped bracket 56 depends from the first L-shaped bracket 50 and is attached thereto by means of bolts and nuts 57 extending through slots 60 in the bracket 56. The slots function in conjunction with the bolts and nuts 57 to provide means whereby the bracket 56 may be vertically adjusted relative to the bracket 50. This bracket 56 carries the second diaphragm actuator 20.

Extending upwardly from the upper portion of the bracket 50 is yet a third L-shaped bracket 58. This bracket 58 may be bolted to the upper portion of the bracket 50 in an adjustable manner if desired. A plate 60 is welded to the bracket and provides supporting means for the button valves 32 and 34. At the lowermost end of the bracket 58 is a notch 62 (see FIG. 2) which allows the passage of the actuator rod 64 of the diaphragm actuator 48. The diaphragm actuator 48 is, of course, secured to the L-shaped brackets 50 and 58, and the primary control valve 26 is fastened to the upper, horizontally extending flange of the bracket 58.

Returning now to the operative elements of the present invention, the actuator rod for the actuator 48 is indicated by the numeral 64 and is partially shown in FIG. 1. A plate 66 is attached to the rod 64 by any satisfactory means such as welding. Pivotally attached to the plate 66 for limited rotation is the drive pawl 70. This pawl 70 pivots upwardly about a horizontal axis which would be perpendicular to the plane of the drawing of FIG. 1 and allows the pawl to ride up on a spring 71 at the end of its instroke.

Also attached to the plate 66 is a second plate 68 which carries the rod 72. This rod 72 is pivotally attached to a T-shaped element 74 which is pivotally secured to a bolt 76. Contact buttons 78 and 80 are threadedly engaged with the T-shaped member 74 for contact with the button valves 32 and 34.

Discussing more fully the pressure release or button valves 32 and 34, a section view of valve 32 is shown in FIG. 4. This, once again, is a device well known in the art and is generally comprised of a cylindrical housing 82 which has openings 84 connecting the interior 86 of the housing with the atmosphere. An appropriate wrench surface 88 is located on one end of the valve so that the valve may be screwed into an appropriate housing 31 (see FIG. 1) by use of the threads 90 located on the opposite end of the valve body. A rod 92 extends through the length of the valve body and is spring biased to the left as viewed in FIG. 4. This brings about a seal between an O-ring 94 carried by the shaft 92 and the valve housing 82. A button 96 is located on the end of the shaft opposite the O-ring seal. As will be readily understood, force exerted against the button portion 96 will move the shaft against the spring bias, thus moving the O-ring away from its seat in the valve body 82. This will allow the gas, fluid or the like to flow into the housing chamber and out the openings 84.

A gear 100, FIG. 2, is to be rotated by the pawl 70, and it is supported by the upstanding plates 94 and 96. A shaft 98 extends between the plates 94 and 96 and is rotatably mounted to these plates. Appropriate bushings 102 are located around the shaft 98 at each of the plates 94 and 96. The gear 100 is fixedly secured to the shaft 98 for rotation therewith. A plate 104 is located on the end of the shaft 98 adjacent the mounting flange 52. Recesses 106 are located in this plate 104 to receive mating lugs (not shown) on a shaft to which the intermittent rotation is to be transmitted.

Returning now to the second actuator 20, this actuator is used to move the second or brake pawl 110. An actuator rod 108 extends from the actuator 20 through an opening 106 in the support bracket 50. The pawl itself is supported on the side of a generally L-shaped support member 112, which is best seen in FIG. 7. At the forwardmost end of this support 112 is a depending flange 114 which is mounted between the brackets 116 to be rotatable about the shaft 118. This shaft 118 is a point of rotation for the support 112 when the actuator rod 108 moves in its outstroke. The pawl 110 is also pivotally mounted about a shaft 120 which is supported between mounting brackets 122. A spring 124 urges the pawl 110 toward the gear 100. Any such movement is limited, however, by the contact of the forward edge 126 of the base of the pawl 110 with the support 112. It will be noted that the curved rearward edge 128 of the pawl 110 will allow rotation of the pawl 110 away from the gear 100 and in opposition to the bias or force exerted by the spring 124.

Turning now to the operation of the present invention, for purposes of explanation we will consider the actuating medium as being compressed gas. When it is desired to rotate the gear 100, compressed gas is delivered to the apparatus through a line (not shown) connected at the inlet 10. This compressed gas stream is divided at 12, a portion of the stream going through outlet 14, flow control valve 18, and line 22 to the actuator 20.

The delivery of the compressed gas to the actuator 20 will extend the actuator rod 108 upwardly thus bringing the pawl 110 into its locking position shown in FIG. 3. In this position, the leading edge of the pawl 110 contacts a tooth on the gear 100. Since the valve 18 allows continuous flow of compressed gas to the actuator 20 so long as gas is being delivered to the inlet 10, the pawl 110 will remain in this extended position throughout the operation of the invention. The spring 124 forces the pawl against the gear, thus insuring constant contact.

A portion of the compressed gas stream will flow through the outlet 16, the elbow 24 and into the inlet of the four-way valve 26. As was pointed out previously, the upper portion of the valve 26 comprises a spool or piston chamber. A portion of the compressed gas entering the inlet 25 flows to both ends of the piston by way of restricted passageways. Most of the compressed gas entering the inlet 25, however, flows into the lower portion of the valve 26 where it may flow out of the outlets 36 or 40, depending upon the position of the piston of the valve 26. As was also pointed out previously, this piston shifts to first and second positions due to pressure differentials that are created in the piston chamber. In one of its positions, the inlet 25 communicates with the actuator port 40 while port 36 communicates with outlet port 38; and in the other spool position, the port 40 communicates with the exhaust port 38 while inlet 25 communicates with port 36.

For the sake of explanation, we will assume that the spool is in the position whereby the inlet 25 is in communication with the outlet 40 which leads to the actuator 48. Accordingly, compressed gas will flow to this actuator, thus extending its actuator rod 64. This will place the pawl 70 in its outstroke movement which will end generally in the position shown in FIG. 3. As one can see by an examination of FIGS. 1 and 3, in moving from the position of FIG. 1 to that of FIG. 3, the leading edge of the pawl 70 will contact a tooth on the gear 100, thus causing the gear to rotate in its counterclockwise direction. The spring force causing the pawl 110 to engage the tooth 100 will yield when the tooth is rotated in this direction, thus allowing the gear 100 to turn. The pawl 110 will then engage the following tooth to prevent rotation in a clockwise direction.

As the pawl 70 moves in its outstroke, the rod 72 will rotate the T-shaped element 74 in a clockwise direction as viewed in FIG. 1. At the end of the outstroke of the pawl 70, the T-shaped element 74 will be in the position shown in FIG. 3. As shown here, the button 80 will contact the button valve 34 which will bleed the line 30 through the openings 84 in the button valve. Line 30 is in fluid communication with the right side of the piston chamber of the primary four-way valve 26. Accordingly, this right side of the piston chamber will experience a pressure drop, causing the piston within the chamber to shift to this side of its chamber.

This shift of the piston will place the actuator port 40 in communication with the exhaust port 38. Accordingly, the compressed air in the actuator 48 will be exhausted to the atmosphere. Since both diaphragm actuators are spring biased to retract their respective actuator rods, the pawl 70 will be moved to the right as viewed in FIG. 1. This will take it out of engagement with the gear 100. The pawl 110, of course, remains engaged and prevents any accidental or undesired clockwise rotation of the gear.

As the pawl 70 nears the end of its instroke, the T-shaped element 74 will have been rotated in a counterclockwise direction until the member 78 contacts the button valve 32. This contact will bleed the line 28 which will result in the left side of the primary valve 26 (as viewed in FIG. 2) experiencing a pressure drop, returning the piston to its original position. This will place the inlet 25 of the primary valve 26 in communication with the port 40 once again, whereby compressed gas will be fed to the diaphragm actuator 48 to begin a new cycle.

As will be readily understood by one skilled in the art, the pawl 70 will be reciprocated in an instroke-outstroke manner due to the alternate shifting of the piston within the valve 26. At the end of each instroke or outstroke of pawl 70, the appropriate button valve 32 or 34 will be opened by contact with its appropriate contact member 78 or 80, thus bringing about the necessary pressure drop and piston shift to continue the operation.

When it is desired to cease operation, the flow of compressed gas is shut off from the inlet 10 by means of a master control or pilot valve (not shown). This will prevent the alternate instroke-outstroke action of the actuator 48. In addition, since the valve 18 will now allow the compressed gas to flow from actuator 20 at a low rate, the pawl 110 will slowly move away from the gear 100. Assuming for the sake of discussion that the present invention is being used to wind a clock, the wound clock mainspring will exert a substantial force tending to rotate the gear 100 in a clockwise direction as viewed in FIG. 1. Although a backlash spring will eventually take hold within the clock to prevent the unwinding, a certain jerking or snapping back may be experienced before this spring takes hold. For this reason, the slow or gradual easing away or withdrawing of the pawl 110 is quite important to prevent this sudden jerking or backlash.

The compressed gas flowing from the actuator 20 will exit through valve 18, the inlet 10 and then through a port at the master or pilot valve (not shown). Any other suitable arrangement may be used such as a restricted orifice in the line 22 or in the line leading to inlet 10. At the same time, the compressed gas flowing from actuator 48 will exit in one of two ways. Assuming the piston in the valve 26 is positioned whereby the actuator port 40 is in communication with the exhaust port 38, the actuator 48 will simply be exhausted through the line 44. Should the piston be in the position whereby the actuator port 40 is in communication with the inlet 25, however, the gas in the actuator 48 will pass through this inlet 25, the T-shaped member 12, inlet 10 and then through the same outlet port as did the gas in the actuator 20. The actuator 48 will, of course, exhaust much more rapidly than actuator 20 since it has no restriction.

When the actuator 48 is completely exhausted, the pawl 70 will retract to the end of its instroke. In so doing, and since the pawl 70 is mounted for limited movement the leading edge will move up onto the spring 71, thus taking it away from any possible contact with the teeth of the gear 100. Pawl 110 will also be retracted sufficiently far from the gear 100 to prevent any possible contact with the teeth of the gear. This can be quite important when the device is used to wind a clock, since as the clock unwinds, the gear 100 will also unwind or rotate in a clockwise direction. It is, therefore, necessary to remove the pawls 70 and 110 whereby they will not engage the gear and prevent this clockwise rotation. Alternatively, a clutch could be installed between plate 106 and its corresponding mating plate or at another suitable place, whereby they would be engaged for counterclockwise rotation (as viewed in FIG. 1) but disengaged when the plate (not shown) that mates with plate 106 begins to rotate in a clockwise direction.

Alternate embodiments for the positioning of the button valve are shown in FIGS. 5 and 6. Discussing first FIG. 5, the plate 60 has been elongated, and the button valves 32 and 34 have been placed in generally horizontal positions. In place of the rocking T-shaped member 74, a bar 130 is used having upstanding lugs or contact members 132 or 134. As will be readily understood, the motion of the bar 130 will be simply a reciprocal instroke-outstroke movement corresponding to the reciprocating motion of the pawl 70. The valves 32 and 34 are located near the limits of the path of travel of bar 130 for contact with members 132 and 134.

In FIG. 6 an L-shaped member 136 rotates about pivot point 76 and carries two contact members 138 and 140. Once again the action of the contact member is a rocking or rotating action and the button valves 32 and 34 have been placed near the ends or limits of the rocking movement for contact with the members 138 and 140, respectively. One skilled in this art will readily recognize that a wide variety of arrangements may be achieved for the valves 32 and 34 and their co-acting members. It is only necessary that the motion of the member connected with the actuator rod be along a defined path and be a motion that is repeated with each corresponding movement of the pawl 70.

The stroke of the pawl can be varied to vary the increments or degrees of rotation of the gear. Various other adjustments can be made in the operating parts to insure proper operation. For example, the contact buttons 78 and 80 are threadedly engaged with the T-shaped member 74 and can be adjusted for proper timing of the opening of the valves 32 and 34 and to compensate for the particular distance of instroke and outstroke traveled by the pawl 70. Furthermore, the bracket 56 is adjustably attached to the bracket 50 so that the actuator 20 may be adjusted vertically relative to the gear 100.

As will be readily understood, the present invention has many applications. One such application which has been previously discussed is the attachment to a strip chart recorder for the periodic winding of the eight-day clock contained in the recorder. It may, of course, be used wherever such intermittent rotation of a member is desired.

The device may also be operated continuously or only periodically. Although the apparatus itself functions completely automatically, the initial starting and stopping of the invention may be either manual or automatic. For example, if it is not necessary for the device to operate continuously but only at certain periods of time, a manually controlled master valve may be utilized for the source of the compressed gas to control the flow to inlet 10.

Should the device be placed in a remote station where manual control is not possible or desired, other means of turning on and off the supply of compressed gas may be utilized. By way of example, a solenoid valve may be used as a master valve at the compressed gas source, which solenoid valve could be actuated by a radio signal. Assuming the winding of a clock by the present invention, apparatus can be devised to determine the tension in the mainspring of the clock. When the tension reaches a minimum level, a signal will be sent out to actuate a solenoid valve to open the supply of compressed gas. In the same manner, the maximum desired tension in the mainspring can be monitored to shut off the flow of compressed gas. Numerous other types of timing or control devices may be employed for periodic operation of the present invention, such as fluid flow metering arrangements, pressure response devices, etc.

When the present invention is used in a fluid control system as disclosed in the previously mentioned U.S. Pat. No. 3,265,086, there are a plurality of signals that occur during the programming, which signals may be based on time measured by electrical, mechanical or fluid powered means or signals based on weights, volumes, rates of flow, temperature, etc. Many of these signals could be utilized to stop and start the operation of the present invention.

One successful arrangement with the above mentioned fluid control system is connecting the present invention to a pilot valve on the time cycle controller. This controller regulates the length of time each well is tested by switching to the next subsequent well at periodic intervals. It thereby controls the test cycle for the wells. During the time that it takes to switch from one well to another, the pilot valve can bleed pressure to the inlet 10 of the winding mechanism so that it winds during the shifting between each of these testing intervals. This same pilot valve can also function as the exhaust for the actuators at the end of the operation when the pressure is cut off from the automatic winding apparatus.

It should be noted that in the claims, certain words are used rather broadly. By way of example, the word "gas" should be construed to include such as pneumatic fluid or liquid. In the same manner, the word "gear" should be defined for purposes of this application as including a shaft or other rotatable device. For instance, a friction clutch could be utilized in place of the pawl, and an element with no teeth could be rotated by use of such a friction contact device.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention and the scope of the appended claims.

We claim:

1. A device for intermittently rotating a gear about a first axis comprising:
    first compressed gas driven actuator means;
    a drive pawl positioned adjacent said gear and being operatively connected to the actuator means for reciprocal movement in first and second directions along a first path of travel that is generally tangential to the gear, movement in the first direction bringing the drive pawl into contact with the gear for rotating it in a first rotational direction;
    a source of compressed gas;
    an exhaust port; and
    control valve means for connecting the compressed gas source to the first actuator means at the end of the movement of the drive pawl in its second direction and for connecting the exhaust port to the first actuator means at the end of the movement of the pawl in its first direction, said first actuator means being biased to move the pawl in its second direction, said control valve means being further defined as including a primary valve chamber having:
        a piston slidable within the primary valve chamber to first and second positions in response, respectively, to first and second pressure differentials in the primary valve chamber, the first actuator means being connected to the compressed gas source when the piston is in its first position, and to the exhaust port when the piston is in its second position, and further including:
        means for creating the first and second pressure differentials when the first pawl reaches the end of its movement in its second and first directions, respectively.

2. The invention of claim 1 wherein the pressure differential creating means is further defined as including:
    first and second contact release valves which are normally closed, each being connected to the primary valve chamber on opposite sides of the piston;
    a contact member connected to the drive pawl for movement along a second path of travel as the drive pawl moves along said first path of travel; and
    said contact release valves being positioned at predetermined points along said second path of travel for actuation by the contact member.

3. The invention of claim 2 wherein the first and second paths of travel are generally parallel and the movement of the contact member is defined as a reciprocating movement between predetermined limits, one of said contact release valves being positioned near each of said limits.

4. The invention of claim 2 wherein the contact member is pivotally connected to the drive pawl and rotatably mounted about a pivot point independent of the movement of the drive pawl, the second predetermined path being about said pivot point, the movement in response to the reciprocal movement of the first pawl.

5. The invention of claim 4 wherein the rocking movement is between defined limits and one of said contact release valves are positioned near each of said limits.

6. The invention of claim 2 wherein:
    the first contact release valve creates the first pressure differential;
    the second contact release valve creates the second pressure differential;
    the contact member has a first movement along said second path of travel that it repeats with each movement of the drive pawl in its first direction;
    a second movement that it repeats with each movement of the drive pawl in its second direction;
    the second contact release valve being positioned near the end of the contact member's movement in its first direction; and
    the first contact release valve being positioned near the end of the contact member's movement in its second direction.

7. A device for intermittently rotating a gear about a first axis comprising:
    first compressed gas driven actuator means;
    a drive pawl positioned adjacent said gear and being operatively connected to the actuator means for reciprocal movement in first and second directions along a first path of travel that is generally tangential to the gear, movement in the first direction bringing the drive pawl into contact with the gear for rotating it in a first rotational direction;
    a source of compressed gas;
    an exhaust port;
    control valve means for connecting the compressed gas source to the first actuator means at the end of the movement of the drive pawl in its second direction and for connecting the exhaust port to the first actuator means at the end of the movement of the pawl in its first direction, said first actuator means being biased to move the pawl in its second direction;
    a brake pawl;
    second compressed gas driven actuator means connected to the compressed gas source and operatively connected to the brake pawl for reciprocal movement of the brake pawl in third and fourth directions along a third path of travel which is also generally tangential to said gear, the movement of the brake pawl in its third direction terminating against said gear whereby the gear will be braked by the brake pawl from rotation opposite to the first rotational direction;
    a master valve for controlling flow from the compressed gas source; and
    flow valve means for allowing a continuous flow of compressed gas to the second actuator means when the master valve is open and for exhausting the second actuator means when the master valve is closed.

8. The invention of claim 7 wherein:
    said brake pawl is biased against said gear whereby the gear is prevented from rotating in the direction opposite said first rotational direction when the master valve is open;
    said brake pawl being rotatable away from the gear when a force greater than said bias is exerted against the brake pawl in said first rotational direction.

9. The invention of claim 7 wherein:
    the flow valve means is further defined as permitting the flow of compressed gas away from the second actuator means at a rate substantially lower than the flow to the second actuator means, and including:

an exhaust port operatively connected to the flow valve means to exhaust the gas flowing away from the second actuator means.

10. The invention of claim 9 wherein:

the gear is a toothed gear;

the brake pawl has an engagement surface directed generally in said first rotational direction;

the brake pawl being biased toward the gear, whereby the gear teeth and engagement surface engage when the master valve is open to prevent rotation of the gear in a direction opposite to said first rotational direction;

the brake pawl being pivotably mounted for rotation away from the gear when subjected to a force exerted in said first rotational direction.

11. A device for intermittently rotating a gear about a first axis comprised of:

a first diaphragm actuator;

a drive pawl operatively connected thereto for reciprocal instroke-outstroke movement along a first path of travel generally tangential to said gear, whereby the gear is contacted and rotated in a first rotational direction during the outstroke of the drive pawl;

a compressed gas source connected to the first diaphragm actuator;

control valve means for regulation of the flow of compressed gas to the first diaphragm actuator including:
i. an inlet for the compressed gas source;
ii. first and second exhaust valves which are normally in a closed position;
iii. an exhaust port;
iv. an actuator port connected to the first actuator means;
v. a spool slidable within the control valve means to first and second positions in response, respectively, to first and second pressure differentials created within the control means, the first pressure differential being created when the first exhaust valve is opened, and the second pressure differential being created when the second exhaust valve is opened;

the first position of the spool opening the actuator port to the inlet;

the second position of the spool opening the actuator port to the third exhaust port; and means connected to the first diaphragm actuator, whereby it moves with the drive pawl, for opening the first exhaust valve at the end of the instroke of the drive pawl and for opening the second valve at the end of the outstroke of the drive pawl.

12. The invention of claim 11 wherein said means for opening the first and second exhaust valves is defined as:

a rocker that rocks as the drive pawl is reciprocated;

the first and second exhaust valves being biased to a normally closed position and being positioned adjacent said rocker for alternate contact with the rocker as it rocks, the exhaust valves being opened upon contact with the rocker.

13. The invention of claim 12 wherein:

the first exhaust valve is positioned for contact by the rocker at the end of the instroke of the drive pawl; and the second button valve is positioned for contact by the rocker at the end of the outstroke of the drive pawl.

14. The invention of claim 11 wherein said means for opening the first and second exhaust valves is defined as:

a contact member that moves in a first direction during the instroke of the drive pawl and in a second direction during the outstroke of the drive pawl;

the exhaust valves being normally closed but being opened upon contact with the contact member;

the first button valve positioned for contact at the end of the movement of the contact member in its first direction; and the second button valve positioned for contact at the end of the movement of the contact member in its second direction.

15. The invention of claim 11, and including:

a second diaphragm actuator;

a brake pawl operatively connected thereto for reciprocal instroke-outstroke movement along a second path of travel which is generally tangential to said gear, the outstroke terminating at said gear, whereby the brake pawl contacts said gear to prevent rotation of the gear opposite to the first rotational direction;

a line connecting the second actuator to the compressed gas source;

a master valve connected to the compressed gas source for shutting off flow from the compressed gas source to both actuators; and valve means in said line for continuous flow of compressed gas to said second actuator, so that the brake pawl is always in contact with said gear when the master valve is open, and for exhausting the second actuator when the master valve is closed.

16. The invention of claim 15 wherein:

the brake pawl is urged against said gear with a predetermined force to prevent the gear from rotating in the direction opposite said first rotational direction when the brake pawl contacts the gear; and the brake pawl being rotatable away from the gear when a force greater than the predetermined force is exerted against the brake pawl in the first rotational direction to allow movement of the gear in the first rotational direction.

17. The invention of claim 15 wherein:

the gear is a toothed gear;

the brake pawl is biased into engagement with the gear teeth when it is in contact with the gear to prevent rotation of the gear in a direction opposite said first rotational direction; and the brake pawl being rotatable away from the gear when the gear moves in said first rotational direction.

18. The invention of claim 15 wherein:

the valve means in said line allows flow of compressed gas away from the second actuator, and including:

a port operatively connected to the valve means to exhaust the gas flowing from the second actuator.